US012153636B2

(12) United States Patent
Seida (10) Patent No.: US 12,153,636 B2
(45) Date of Patent: Nov. 26, 2024

(54) ONLINE REPUTATION MONITORING AND INTELLIGENCE GATHERING

(71) Applicant: BIZHIVE, LLC, Troy, MI (US)

(72) Inventor: Judd Seida, Troy, MI (US)

(73) Assignee: BIZHIVE, LLC, Troy, MI (US)

( * ) Notice: Subject to any disclaimer, the term of this patent is extended or adjusted under 35 U.S.C. 154(b) by 149 days.

(21) Appl. No.: 16/188,394

(22) Filed: Nov. 13, 2018

(65) Prior Publication Data
US 2020/0151278 A1 May 14, 2020

(51) Int. Cl.
*G06F 16/951* (2019.01)
*G06F 16/954* (2019.01)
*G06Q 50/00* (2024.01)
*H04L 67/10* (2022.01)

(52) U.S. Cl.
CPC .......... *G06F 16/951* (2019.01); *G06F 16/954* (2019.01); *G06Q 50/01* (2013.01); *H04L 67/10* (2013.01)

(58) Field of Classification Search
CPC ..... G06F 16/951; G06F 16/954; G06Q 50/01; H04L 67/10
See application file for complete search history.

(56) References Cited

U.S. PATENT DOCUMENTS

| | | | | |
|---|---|---|---|---|
| 8,214,380 B1* | 7/2012 | Bettinger | ............ | G06F 16/9535 707/758 |
| 8,484,730 B1* | 7/2013 | P. R. | ................... | G06F 11/3438 726/22 |
| 8,578,501 B1* | 11/2013 | Ogilvie | ................... | H04L 67/10 726/26 |
| 8,918,312 B1* | 12/2014 | Rehling | ................... | G06F 40/30 704/9 |
| 2005/0261987 A1* | 11/2005 | Bezos | ................... | G06Q 30/00 705/26.44 |
| 2006/0085419 A1* | 4/2006 | Rosen | ................ | G06Q 30/0269 |
| 2011/0231381 A1* | 9/2011 | Mercuri | ................ | G06F 16/951 707/706 |
| 2011/0258560 A1* | 10/2011 | Mercuri | ................ | G06F 16/958 709/204 |
| 2012/0233665 A1* | 9/2012 | Ranganathan | .......... | G06F 21/51 726/4 |
| 2013/0085804 A1* | 4/2013 | Leff | ................... | G06Q 30/0219 705/7.29 |
| 2013/0232014 A1* | 9/2013 | Judd | ................... | G06Q 30/0277 705/14.73 |
| 2016/0261708 A1* | 9/2016 | Rajagopalan | .......... | G06Q 30/02 |
| 2016/0352805 A1* | 12/2016 | Seida | ................... | G06Q 50/265 |

\* cited by examiner

*Primary Examiner* — Mark D Featherstone
*Assistant Examiner* — Tony Wu
(74) *Attorney, Agent, or Firm* — MaxGoLaw PLLC (57) ABSTRACT

A system and method is provided for an automated online reputation monitoring and intelligence gathering solution that also provides services that manage a reputation once content damaging to the reputation has been identified. Functions and services of the automated online reputation monitoring and intelligence gathering solution include the aggregation of information from non-proprietary websites and social networks, the ability to contact support for assistance with reputation management, the ability to submit requests to fix online reputation, and the delivery of alerts directly to a user device.

19 Claims, 7 Drawing Sheets

ONLINE REPUTATION MONITORING AND INTELLIGENCE GATHERING

FIELD OF THE INVENTION

The present invention generally relates to reputation management, and more specifically to an online reputation management and intelligence service with support and service requests once damaging reputation content or content that concerns the users has been identified.

BACKGROUND OF THE INVENTION

Business professionals, corporate executives, professional athletes, political figures, and icons in the entertainment industry often require the management and monitoring of their online reputations. Reputation management is the influencing and/or control of an individual's or business's reputation, and includes the practice of monitoring the reputation of an individual or brand on the Internet, addressing content which is potentially damaging to an individual or brand, and using customer feedback solutions to get feedback or early warning signals to reputation problems. Most of reputation management is focused on pushing down negative Internet based search results using search engine optimization (SEO), management of online reviews and comments, and petitioning comments, reviews, and content under the Digital Millennium Copyright Act. Reputation management may attempt to bridge the gap between how a company perceives itself and how others view the company.

User-driven content is one of the most powerful forces in affecting the online reputation of an organization or of an individual and buying decisions of its prospective customers. Key decision makers have taken notice of this fact and are investing in the proper tools to protect their corporate and personal online reputation.

Examples of websites where a company may conduct reputation management are websites that have one-way or two-way feedback systems or post customer reviews of products or services. Major internet search engine websites and their results are also a primary target of reputation management efforts. Some of the tactics used by reputation management firms include the following: improving the keyword tagging and search engine optimization of company-published materials and website pages, in order to push down negative content; publishing original, positive content in websites and social media profiles, with the aim of outperforming negative results in a search. Submitting articles and press releases to authoritative websites in order to promote brand presence and suppress negative content; submitting legal take-down requests if someone believes they have been libeled or has experienced trademark or copyright infringement; obtaining mentions for a business or individual in third-party sites that rank highly on major search websites, directories, and search engines; and proactively responding to public criticism stemming from recent changes. Less than scrupulous methods may also be applied to boost online reputations including: censoring negative complaints or using SEO tactics to game the system and influence results; creating fake blog posts pretending to be a different person with that of a different online persona that shares the same name in order to push down negative search results on the actual person or brand; using spam bots and denial-of-service attacks to force sites with damaging content off the web entirely; masking the sponsors of a message or organization (e.g., political, advertising, religious or public relations) to make it appear as though it originates from and is supported by grassroots participant(s); and proactively offering free products to prominent reviewers.

While there are many tools and software solutions for online reputation monitoring, these tools and solutions fail to provide on-demand services that manage a reputation once damaging reputation content has been identified. Thus there is a strong need in the art for a comprehensive reputation monitoring solution that also manages personal and corporate reputation once damaging reputation content has been identified.

SUMMARY OF THE INVENTION

A computer-implemented method for automated online reputation monitoring and intelligence gathering is provided that includes receiving a set of keywords and phrases devised and submitted by an end user from a user device, the user device networked with a sever, establishing a set of filters and monitoring or searching one or more online sources, data sources, websites, and social networks with the filters based on the set of keywords and phrases to obtain information related to the end user. The information is aggregated from the one or more websites and the one or more social networks, and then categorized into categories including a threat, positive information to the end user, a marketing opportunity, or competitive intelligence. The categorized information is stored in a database. Calculating a set of individual online reputation scores for each of the categories. The end user is notified with an alert when a score exceeds a threshold or information meeting a set of criteria based on the set of keywords and phrases is found. A request received from the end user to fix their online reputation in response to the alert is sent to an administrator or support personnel to fix the online reputation of the end user.

A non-transitory computer-readable medium for implementing automated online reputation monitoring and intelligence gathering is provided that includes instructions stored thereon, that when executed on a processor provides an application (app) for an end user device with a graphical user interface (GUI) from a platform. A set of keywords and phrases devised and submitted by an end user from the end user device is received, the user device networked with a server with the non-transitory computer-readable medium. A set of filters is established for monitoring or searching one or more online sources, data sources, websites, and social networks with the filters based on the set of keywords and phrases to obtain information related to the end user. The information is aggregated from the one or more websites and the one or more social networks, and then and categorized into categories including a threat, positive information to the end user, a marketing opportunity, or competitive intelligence. The categorized information is stored in a database. A set of individual online reputation scores is calculated for each of the categories. The end user is notified with an alert when a score exceeds a threshold or information meeting a set of criteria based on the set of keywords and phrases is found. A request received from the end user to fix their online reputation in response to the alert is sent to an administrator or support personnel to fix the online reputation of the end user.

A system for implementing automated online reputation monitoring and intelligence gathering, the system includes a computer server networked to one or more end user devices, where the computer server is configured to run a non-transitory computer readable medium stored in a memory system having instructions stored thereon for online reputation monitoring and intelligence gathering, that when executed on a processor, cause a method to be carried out. The method includes receiving a set of keywords and phrases devised and submitted by an end user from a user device, establishing a set of filters and monitoring or searching one or more online sources, data sources, websites, and social networks with the filters based on the set of keywords and phrases to obtain information related to the end user. The information is aggregated from the one or more websites and the one or more social networks, and then and categorized into categories including a threat, positive information to the end user, a marketing opportunity, or competitive intelligence. The categorized information is stored in a database. Calculating a set of individual online reputation scores for each of the categories. The end user is notified with an alert when a score exceeds a threshold or information meeting a set of criteria based on the set of keywords and phrases is found. A request received from the end user to fix their online reputation in response to the alert is sent to an administrator or support personnel to fix the online reputation of the end user.

BRIEF DESCRIPTION OF THE DRAWINGS

The present invention is further detailed with respect to the following drawings that are intended to show certain aspects of the present invention, but should not be construed as a limit on the practice of the present invention.

DETAILED DESCRIPTION OF THE INVENTION

The present invention has utility as an online reputation monitoring and intelligence gathering solution that also provides services that manage a reputation once content damaging to the reputation has been identified. Functions and services that are unique to embodiments of the inventive online reputation monitoring and intelligence gathering solution include the aggregation of information from non-proprietary (e.g., publically available or accessible) websites and social networks, the ability to contact support for assistance with reputation management, the ability to submit requests to fix online reputation, and the delivery of alerts directly to a user device.

In a specific inventive embodiment collected online reputation data may be analyzed and placed into categories illustratively including a threat (negative to the client), a positive (reinforcement) mention, a marketing opportunity, and competitive intelligence. As reputation data for each of the above category types is collected, the data is filtered and clustered to create a bona fide profile based on the source data collected, and allows the user to view and interact with information over time so they can determine how their online reputation is impacted based on their activities. In a particular inventive embodiment, the impact or measure of improvement or regression of the collected data is based on a scoring system defined further below.

Table 1 provides a comparison between an embodiment of the reputation monitoring and intelligence solution of the present invention and a product offering from GOOGLE®, Inc. known as GOOGLE® Alerts™. GOOGLE® Alerts™ is a content change detection and notification service, which sends emails to the user when it finds new results—such as web pages, newspaper articles, or blogs—that match the user's search term. As shown in Table 1, embodiments of the inventive online reputation monitoring and intelligence solution provide the ability to aggregate from additional information sources as compared to GOOGLE® Alerts™, as well as the ability to contact support for assistance with reputation management, the ability to submit requests to fix online reputation, the delivery of alerts to a user device illustratively including a smartphone, a tablet, portable computing devices, and desktop computing devices, and the ability for the user to submit requests to fix online reputations.

Table 1. Comparison of GOOGLE® Alerts and embodiment of present invention.

|  | GOOGLE® Alerts | Present Invention |
|---|---|---|
| Allows for alert creation, editing, and management | Yes | Yes |
| Aggregates from GOOGLE® News | Yes | Yes |
| Aggregates from GOOGLE® Blog | Yes | Yes |
| Aggregates from GOOGLE® Search | Yes | Yes |
| Aggregates from GOOGLE® Video | Yes | Yes |
| Aggregates from GOOGLE® Books | Yes | Yes |
| Aggregates from GOOGLE® Finance | Yes | Yes |
| Aggregates from TWITTER® | No | Yes |
| Aggregates from FACEBOOK® | No | Yes |
| Aggregates from YAHOO® | No | Yes |
| Aggregates from YAHOO®News | No | Yes |
| Aggregates from BING | No | Yes |
| Aggregates from BING® News | No | Yes |
| Ability to contact support for assistance with reputation management | No | Yes |
| Ability to submit requests to fix online reputation | No | Yes |
| Delivers alerts directly to your smartphone | No | Yes |

Aspects of online reputation and intelligence that are monitored by embodiments of the inventive service that may result in competitive advantages in key areas illustratively may include, but are not limited to, company brand monitoring, personnel monitoring, competitive intelligence, monitoring of products and services, gathering of online sentiment, monitoring of online comments by users, discovery of new business opportunities, discovery of new sources for online marketing, discovery of new sources for online reputation monitoring, and revealing online marketing strategies of the competition.

Embodiments of the inventive reputation monitoring and intelligence solution monitor online sources, websites, and networks that have the greatest impact on online reputations. Non-limiting examples of online sources, websites, and networks that may be monitored illustratively include: major social networks, major search engines, blogs, authority blogs, industry and niche forums, and online review websites, social media websites, social bookmarking websites, social news websites, informational websites, wikis, creative commons databases, image sharing websites, image posting websites, online one-way review websites, online two-way review websites, real simple syndication (RSS) feeds, online news websites and sources, online forums, online communities, public record websites, email address information, personal residence information, business entity information and filings, online video file websites and networks, online audio file websites and networks, online book repositories, online video game websites and networks, and legal/court documents available in the public domain.

Embodiments of the inventive reputation monitoring and intelligence solution provide users with the unique ability to input, customize, and manage keywords or phrases that retrieve specific information from online sources that the user otherwise could not locate through general online searching. In a specific inventive embodiment a user may enter up to ten keywords and/or phrases of their creation in order to conduct online reputation monitoring and intelligence gathering. Additional embodiments may allow for the entry of more than ten keywords and phrases. Illustrative non-limiting examples of online resources that may be searched and monitored may include GOOGLE®, Yahoo, Bing, Twitter, and Facebook. Following the retrieval of the custom information, embodiments of the inventive the online reputation monitoring and intelligence solution filters the data for relevance and then displays the information to the end user in a convenient, easy-to-use interface. The easy-to-use interface may be embodied as an internet webpage for display on a computing device, downloadable software for a computing device, and as an application (app) designed for mobile communication and computing devices illustratively including smartphones and tablets. Embodiments of the reputation monitoring and intelligence solution may be offered as a cloud based service.

As embodiments of the reputation monitoring and intelligence solution identify new information, retrieve the new information, and filter the new information content, forms of the program or app notify users of updates in the form of "reputation alerts." The reputation alerts appear graphically within the application and are announced in the form of standard push audio alerts much like text message alerts. In a specific embodiment as reputation alerts are identified when an online resource or data source meets at least one of the following criteria: a keyword or phrase that matches in the source meta title; a keyword or phrase that matches the source meta description; a keyword or phrase that matches in the source universal resource locator (URL); and a keyword or phrase that matches in the source content.

The reputation alerts may be accompanied with a "fix it" feature that provides a user with the ability to privately communicate a request for online reputation management assistance from a team of experts associated with embodiments of the reputation monitoring and intelligence solution. Following the submission of a "fix it" request feature by a user, a confidential review of an account belonging to the user is conducted by the team of experts, and recommendations to assist in the management of the user's reputation may be made to the user. Examples of recommendations to assist in the management of the user's reputation may illustratively include one or more of the following services: website development, search engine optimization (SEO), search engine advertising, blog development and blogging services, custom content development, social media marketing, web analytics, and online link development.

While several steps performed by an inventive process and a non-transitory system involve one or more abstract ideas, the present invention as a whole includes aspects that amount to significantly more than the abstract idea. Indeed, aspects of the present invention have never been previously performed in manual or digital form prior to the present invention. As recitations of using a non-transitory computer medium to perform automated online reputation monitoring and intelligence gathering. The system provides a platform and graphical user interface (GUI) via a software application (app) on the end user's device that comprises instructions stored thereon, that are executed on a processor that allows a user the unique ability to input, customize, and manage keywords or phrases that retrieve specific information from online sources that the user otherwise could not locate through general online searching. Furthermore, as embodiments of the reputation monitoring and intelligence solution identify new information, retrieve the new information, and filter the new information content, forms of the program or app notify users of updates in the form of "reputation alerts." The reputation alerts appear graphically within the application and are announced in the form of standard audio alerts much like text message push alerts. The reputation alerts may be accompanied with a "fix it" feature that provides a user with the ability to privately communicate a request for online reputation management assistance from a team of experts associated with embodiments of the reputation monitoring and intelligence solution.

These aspects of the present invention as an automated online reputation monitoring and intelligence gathering platform, amount to significantly more than simply providing a search engine and data entry. Embodiments of the inventive reputation monitoring and intelligence solution monitor online sources, websites, and networks that have the greatest impact on online reputations. The reputation alerts generated by the inventive process and the non-transitory system may be accompanied with a "fix it" feature that provides a user with the ability to privately communicate a request for online reputation management assistance from a team of experts associated with embodiments of the reputation monitoring and intelligence solution.

As a result, the present invention provides a highly effective reputation monitoring and intelligence solution that alerts end users of events and information relevant to the end user and automatically sends the alerts to the end user's device. Thus, the inventive reputation monitoring and intelligence gathering platform solves the problems inherent with current method and modes for reputation management that employ tools and solutions that fail to provide services that manage a reputation once damaging reputation content has been identified. The present invention has the effect of improving reputation management by providing a comprehensive reputation monitoring solution that also manages a reputation once damaging reputation content has been identified.

The invention recites a series of acts for implementing an online reputation monitoring application (app) on an end user device that also allows the user to manage a reputation once damaging reputation content has been identified.

The invention relates to software technology that implements an app on an end user device with a graphical user interface (GUI) from a platform, where the platform receives information from and about the end user and also gathers information by automatically monitoring online sources, websites, and social networks that have the greatest impact on online reputations of the end user. The platform generates alerts based on the received information, and sends notifications to the end user. Accordingly, the inventive steps do not recite an abstract idea nor do they implicate any other judicial exception.

In addition, the claimed invention is also directed to a non-transitory computer-readable medium, which is a manufacture, and thus a statutory category of invention.

Figure 1A:
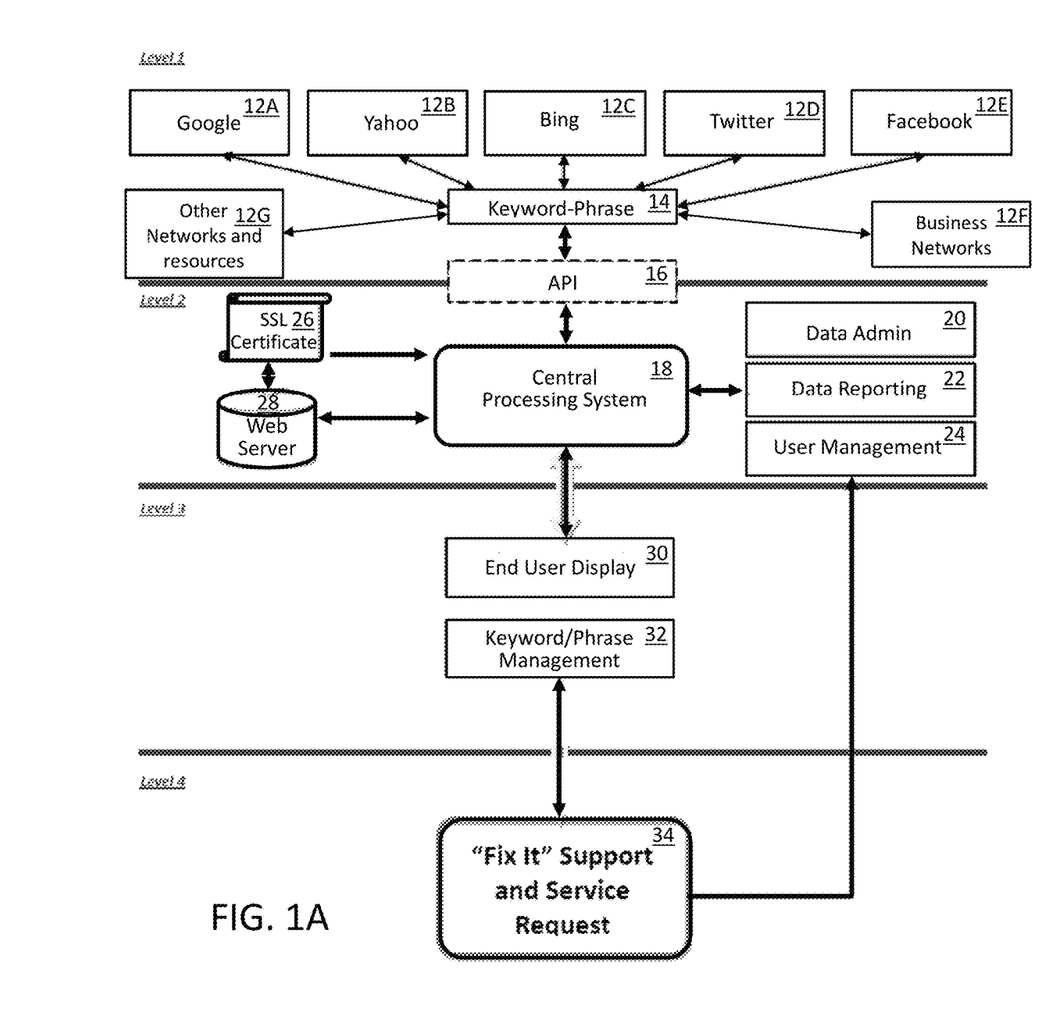
FIG. 1A is a functional block diagram of the process flow for online reputation management and intelligence service in accordance with embodiments of the invention.

Referring now to the figures, FIG. 1A is a functional block diagram 10 of the process flow for reputation management and intelligence service in accordance with embodiments of the invention. An end user display 30 is used to provide the end user with a graphical user interface (GUI), which may be a webpage or app, described further with respect to FIGS. 2-5, on their device to enter and receive information with regards to managing their reputation and for receiving intelligence information. The user may enter keywords and phrases via the keyword and phrase management software interface 32, where the entered keywords and phrases are communicated via a network connection to a central processing system 18. Embodiments of the GUI and user entry may be coded using many well-known codes and scripts illustratively including, but not limited to, hypertext preprocessor (PHP), JavaScript, cascading style sheets (CSS), and Cordova. The central processing system 18, which may be hosted on a web server 28, generates application program interfaces (API) 16 that are used to interact, search, and interrogate online resources 12A-12G with user inputted keywords and phrases 14 provided via the API 16. The API 16 illustratively includes PHP, JQuery, and JavaScript object notation (JSON). The server and hosting functions may be implemented using many well-known coding languages and scripts and relational database management system (RDBMS) tools illustratively including, but not limited to, Linux, PHP, and structured query language (SQL, MySql). Security certificates may be generated by secure sockets layer (SSL) module 26 that provides a secure connection between internet browsers and websites. The central processing system also provides administrative functions illustratively including data administration 20, data reporting 22, and user management module 24 of end users. The fix it support and service request 34 may be generated via the keyword and phrase management software interface 32 provided on the end user display 30, as shown in the screenshots of FIGS. 4A and 4B. The fix it support and service request 34 is processed via the user management module 24.

In a specific embodiment of the reputation management and intelligence service, when an application (app) is installed on an end user's mobile device, the universally unique identifier (UUID) associated with the mobile device is sent to the web server 28. Subsequently, keywords and phrases may be entered by the end user, and a notification is registered with GOOGLE® Cloud Message. As users of the app produce new accounts, login, and activate keywords the information is inputted via the graphic user interface (PHP code display) and transported (via JavaScript coding) to the web server 28. The web server hosting environment (Linxu) operates database files and sequences programmed (in MySQL) such that the information inputted, changed, and utilized is stored and access through calling files from the web server databases. When a new alert arrives from GOOGLE® Cloud Message, the web server 28 sends the reputation alert text with the UUID to GOOGLE® and GOOGLE® then delivers the push alert notification to the registered mobile phone of the end user.

Figure 1B:
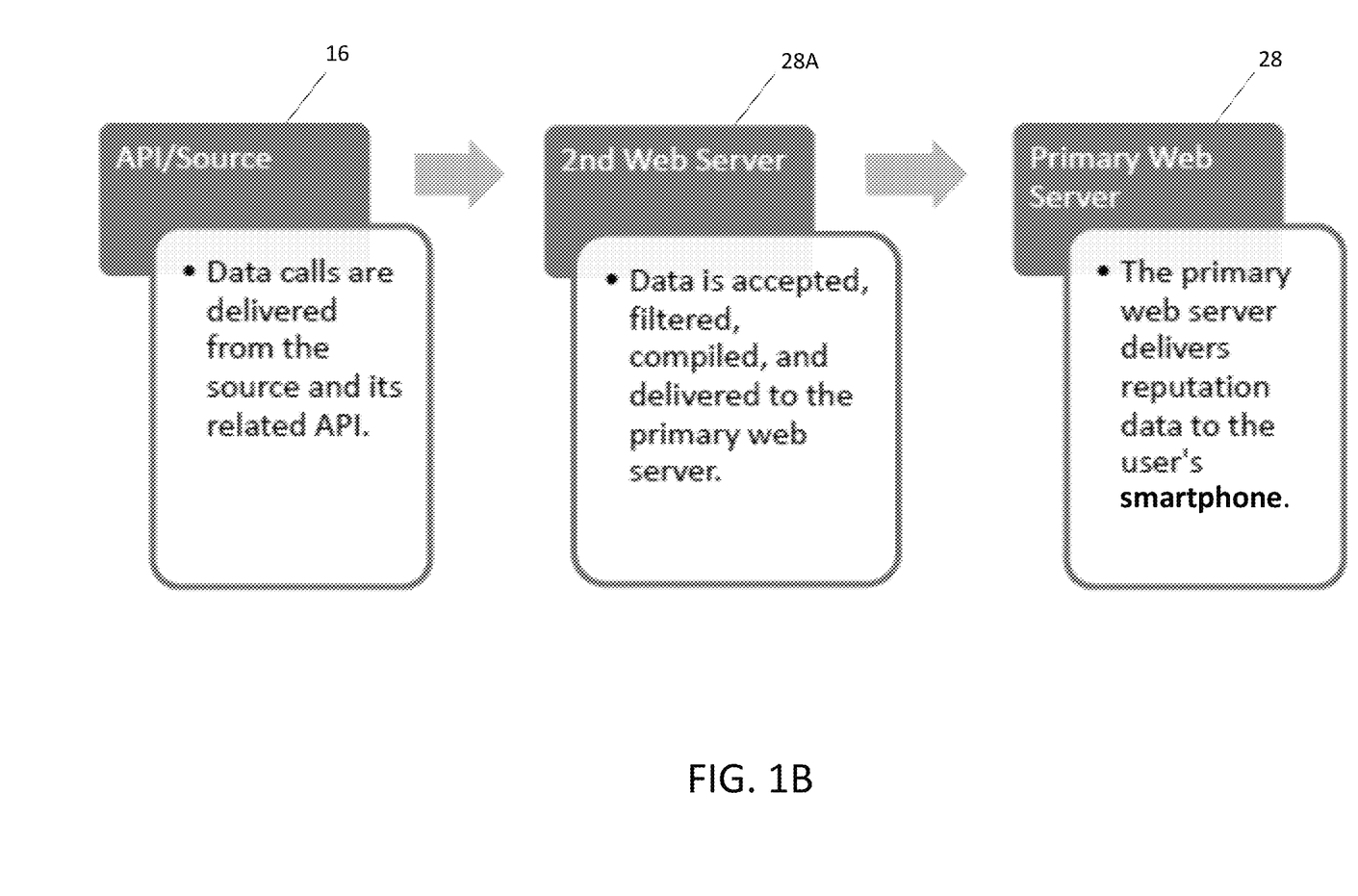
FIG. 1B is a functional block diagram of a process flow for expediting delivery data flowing from certain reputation sources to user smartphones in accordance with embodiments of the invention.

FIG. 1B is a functional block diagram of a process flow for reputation management within the framework of FIG. 1A that is used to expedite data flowing from certain reputation sources to a user device, where the reputation sources are prone to slow delivery of reputation data. The problem of slow delivery of reputation data is particularly acute for data delivery to smartphones from these reputation sources. In order to remediate the problem of slow delivery from these reputation sources an intermediate web server 28A may be used exclusively for receiving, filtering, compiling, and delivering reputation data to user smartphones, with the reputation data for the app being delivered quicker and more reliably. After receiving, filtering, and compiling data, the intermediate web server 28A relays reputation data directly to the main server 28 of FIG. 1A, and the main server 28 provides the reputation data to users of the app. In a specific inventive embodiment the intermediate web server 28A may be a virtual private server operating the Ubuntu 14.04 LTS operating system.

Figure 2:
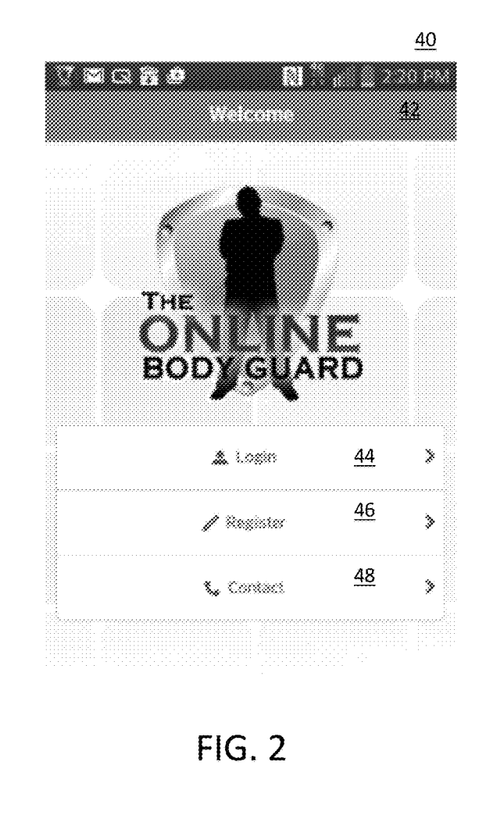
FIG. 2 is a screenshot of the welcome screen for an application (app) for the online reputation management and intelligence service in accordance with embodiments of the invention.

FIG. 2 is a screenshot 40 of the welcome screen 42 for an application (app) for the online reputation management and intelligence service in accordance with embodiments of the invention. The layout of the GUI shown in FIG. 2 is designed to fit the smaller screen found on mobile devices illustratively including smartphones and tablets. A first time end user of the app is invited to register via the register link 46, otherwise a registered user logs in via login link 44. The end user may also contact the reputation management and intelligence service via the contact link 48. In a specific embodiment, the main login of the app requires end users to enter their registered email address and password credentials to gain access to the information. A forgot password feature may be provided for users that wish to reset their account password.

Figure 3:
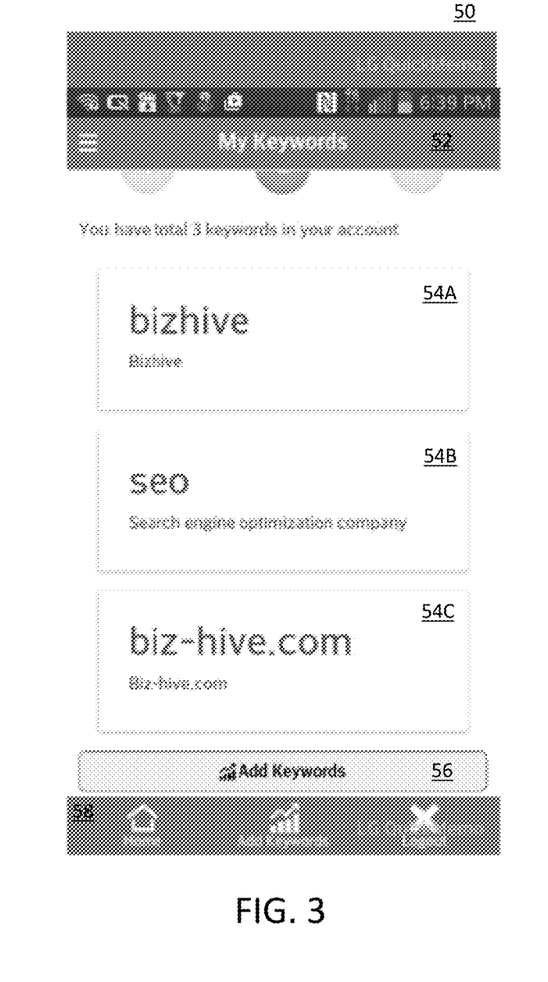
FIG. 3 is a screenshot of the keyword entry and listing screen for an app for the online reputation management and intelligence service in accordance with embodiments of the invention, showing how the keywords are set as that is where the user will assign keywords to their registered account.
Figure 4A:
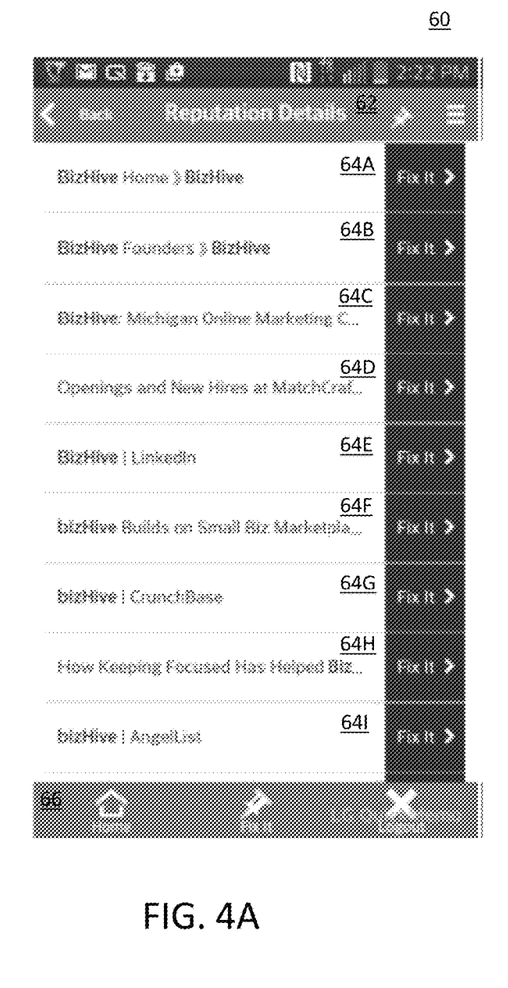
FIGS. 4A and 4B are screenshots depicting the reputation alert data and the submission of a request from the user.
Figure 4B:
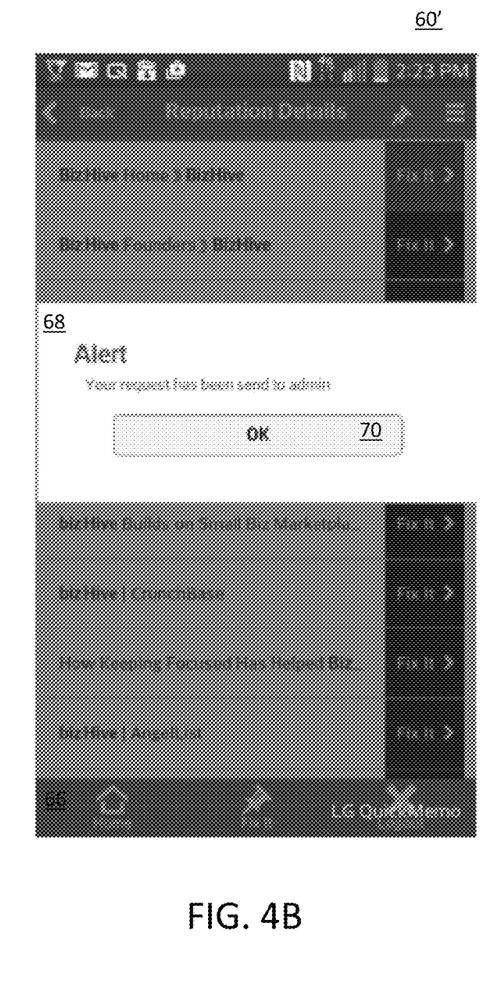

FIG. 3 is a screenshot 50 of the keyword entry and listing screen 52 for an app for the online reputation management and intelligence service in accordance with embodiments of the invention. The keyword entry and listing screen 52 provides the end user with a scrollable listing of keywords and phrases. As shown, three keywords are displayed at a time 54A-54C, but as the end user scrolls down additional keywords and phrases may be shown. The end user may add keywords and phrases via add keyword button 56. The navigation bar 58 allows the end user to navigate in the app. Keywords and phrases may be edited by selecting the keyword, editing the existing keyword or phrase, and then saving the new keyword or phrase.

FIGS. 4A and 4B are screenshots (60, 60') for reputation alerts 62 and provide a listing of current alerts (64A-64I), and also provides for the selection of the "Fix It" option for the app in accordance with embodiments of the invention. The reputation alerts (64A-64I) displayed are based on the keywords or phrases assigned by the end user, and may be shown in a scrollable list. Next to each reputation alert (64A-64I) the "Fix It" feature allows the end user to send the selected reputation data directly to the reputation management and intelligence service, by selecting the "Fix It" button associated with a particular reputation alert.

As shown in FIG. 4B an alert message 68 appears as an overlay over screenshot 60 of FIG. 4A. The alert message 68 is generated in response to the end user's "Fix It" request, and is displayed within the user's account to notify the end user that their request has been submitted to the administration of the reputation management and intelligence service for actions to be taken to resolve end user reputation or competitive issues. In a specific embodiment the alert message requires the end user to confirm the message delivery by depressing the "OK" button 70 that appears in the middle of the message.

Figure 5A:
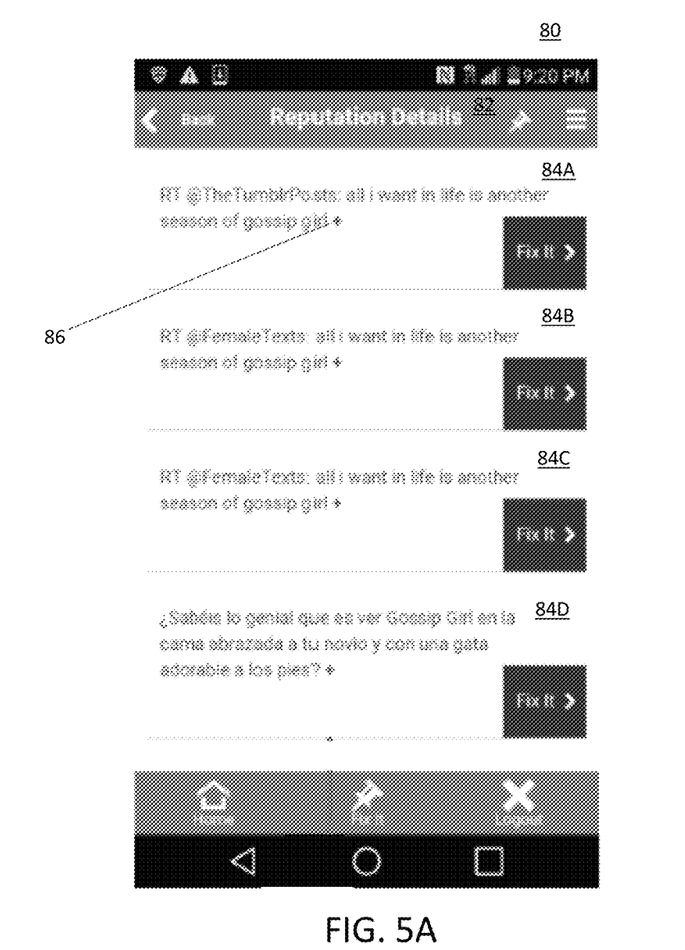
FIGS. 5A and 5B are screenshots illustrating an expansion feature that provides a user with additional information concerning a reputation alert via a series of links that are provided directly with each of the reputation alerts in a listing of current alerts in accordance with embodiments of the invention.
Figure 5B:
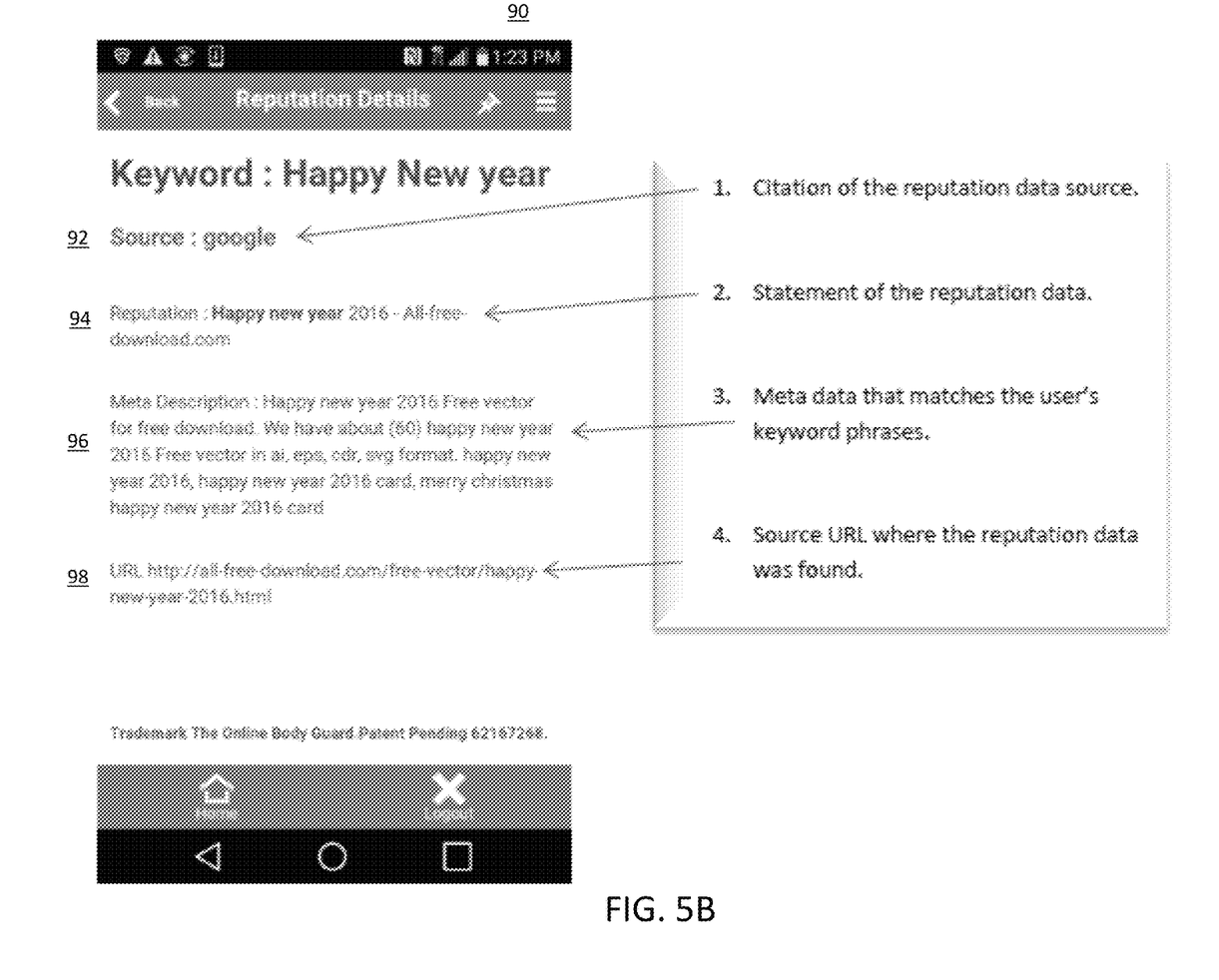

FIGS. 5A and 5B are screenshots (80, 90) illustrating an expansion feature that provides a user with additional information concerning a reputation alert via a series of links 86 that are provided directly with each of the reputation alerts in a listing of current alerts (84A-84D), and also provides for the selection of the "Fix It" option for the app in accordance with embodiments of the invention. The reputation alerts (84A-84D) displayed are based on the keywords or phrases assigned by the end user, and may be shown in a scrollable list where additional alerts may be shown (if available) on the user's screen as the user scrolls down. Next to each reputation alert (84A-84D) the "Fix It" feature allows the end user to send the selected reputation data directly to the reputation management and intelligence service, by selecting the "Fix It" button associated with a particular reputation alert. Selection of the expansion link 86 (shown as a plus sign (+)) may send the user to screenshot 90 of FIG. 5B that provided the user with additional information about the particular reputation alert selected. Additional information may illustratively include: citation of the data source (92); a statement of the reputation data (94); meta data that matches the user's keyword phrases (96); and source URL where the reputation data was found (98).

In a specific inventive embodiment as keywords are entered and/or modified by the user of the online reputation management app the data that is recalled from the reputation data sources is also created and/or modified such that the expanded view of the reputation data reflects these updates. More specifically, the keywords entered and/or modified by the user are included in a contextual variable that the app code now uses to find and evaluate relevant reputation data. Elements for this contextual variable may illustratively include: the website or source meta title tag; the website or source meta description data; the website or source Uniform Resource Locator or URL; and the website or source content data.

In a specific inventive embodiment, filters for user accounts are created during the set-up of an account, and the duties for filter creation are shared by both the user and the administrator.

For example, the user may filter reputation data by the following methods:
  Identifying and entering keywords and keyword phrase that will be used in the account
  Identifying public sources that will and will not be used for the account
While the administrator may filter reputation data by the following methods:
  Identify and incorporate public sources that will and will not be used for the account
  A customized script in the programming language of PYTHON searches and filters (parses) information based on the following criteria:
    Keyword or phrase in meta title
    Keyword or phrase in meta description
    Keyword or phrase in on-page content
    Deep crawl for sources of repeat information
    Keyword or phrase in the domain URL
    On-page headings (h1, h2, h3)
    On-page text links
  Repetitive or multiple sources that appear with content that identifies as one of the main categories gets assigned a stronger score. For example, should one keyword produce 10 negative sources versus 1 positive source, the negative reputation score would be higher because of the increased incidence of negative content impacting the user's reputation.

The filtered reputation data may be categorized in the following categories: threats, positive, marketing opportunities, and competitive intelligence.

A user dashboard may organize the collected reputation data under the aforementioned categories with the following format or architecture for presenting information identifying the data as well as features and functions of the reputation management app:
  1. Threats
    a. Profiles—Named by Source (Score)
      i. Data that is threatening
        1. Title
        2. Description
        3. Source Link
        4. Date
      ii. Expert Insights
      iii. Fix It
      iv. Add to reports
  2. Positive
    a. Profiles—Named by Source (Score)
      i. Data that is positive
        1. Title
        2. Description
        3. Source Link
        4. Date
      ii. Expert Insights
      iii. Fix It
      iv. Add to reports
  3. Marketing Opportunities
    a. Profiles—Named by Source (Score)
      i. Data that is a marketing opportunity
        1. Title
        2. Description
        3. Source Link
        4. Date
      ii. Expert Insights
      iii. Fix It
      iv. Add to reports
  4. Competitive Intelligence
    a. Profiles—Named by Source (Score)
      i. Data that is competitive intelligence
        1. Title
        2. Description
        3. Source Link
        4. Date
      ii. Expert Insights
      iii. Fix It
      iv. Add to reports An online reputation score may be calculated as follows:
  1. Threat Score—number of sources, sentiment, frequency of source
  2. Positive Score—number of sources, sentiment, frequency of source
  3. Marketing Opportunity Score—unclaimed opportunities,
  4. Competitive Intelligence Score—competitor search engine rankings, competitor social media accounts, competitor directories, competitor comments and posts

| Low | Medium | High |
|-----|--------|------|
| 17% | 53%    | 95%  |

In a specific inventive embodiment the formula for scoring online reputation data is as follows:

$$(\text{Total Low} + \text{Total Medium} + \text{Total High})/\text{Total Selections} = \text{Online Reputation Score (\%)}$$

It is noted for the above categories can and will fluctuate as reputation data is collected, filtered, and applied to a user's account.

The online reputation score may be used to quantify the activity in a user account, and may be used to determine specific action(s) needed to address the data in each of the categories. Triggers for push alerts to be sent to a user's account may be set based on specified thresholds to which the calculated scores are compared to. Thresholds for push alerts may be set up during the account creation process. Examples of these thresholds illustratively include:
1. X number of competing sources found in Google for a particular search term.
2. X number of competing sources found in Yahoo for a particular search term.
3. X number of competing sources found in Bing for a particular search term.
4. X number of competing Facebook pages for a particular search term.
5. X number of competing Twitter accounts for a particular search term.
6. X number of competing Tweets that contain a particular search term.
7. X number of online directories that contain a particular search term.

Automated suggestions may be made to a user based on the calculated reputation profile score. For example, when a profile score reaches a certain predetermined threshold, the user will be notified via push alert and offered the opportunity to fix it. For example, in the event X or more first page search engine rankings are achieved by a competing company for a user's name, a text message will be sent to the user alerting them of the matter, along with link to an issue-specific page on the reputation management website (www.TheOnlineBodyGuard.com) that will offer suggestions for improvement and an opportunity to fix the matter through managed services.

Figure 6:
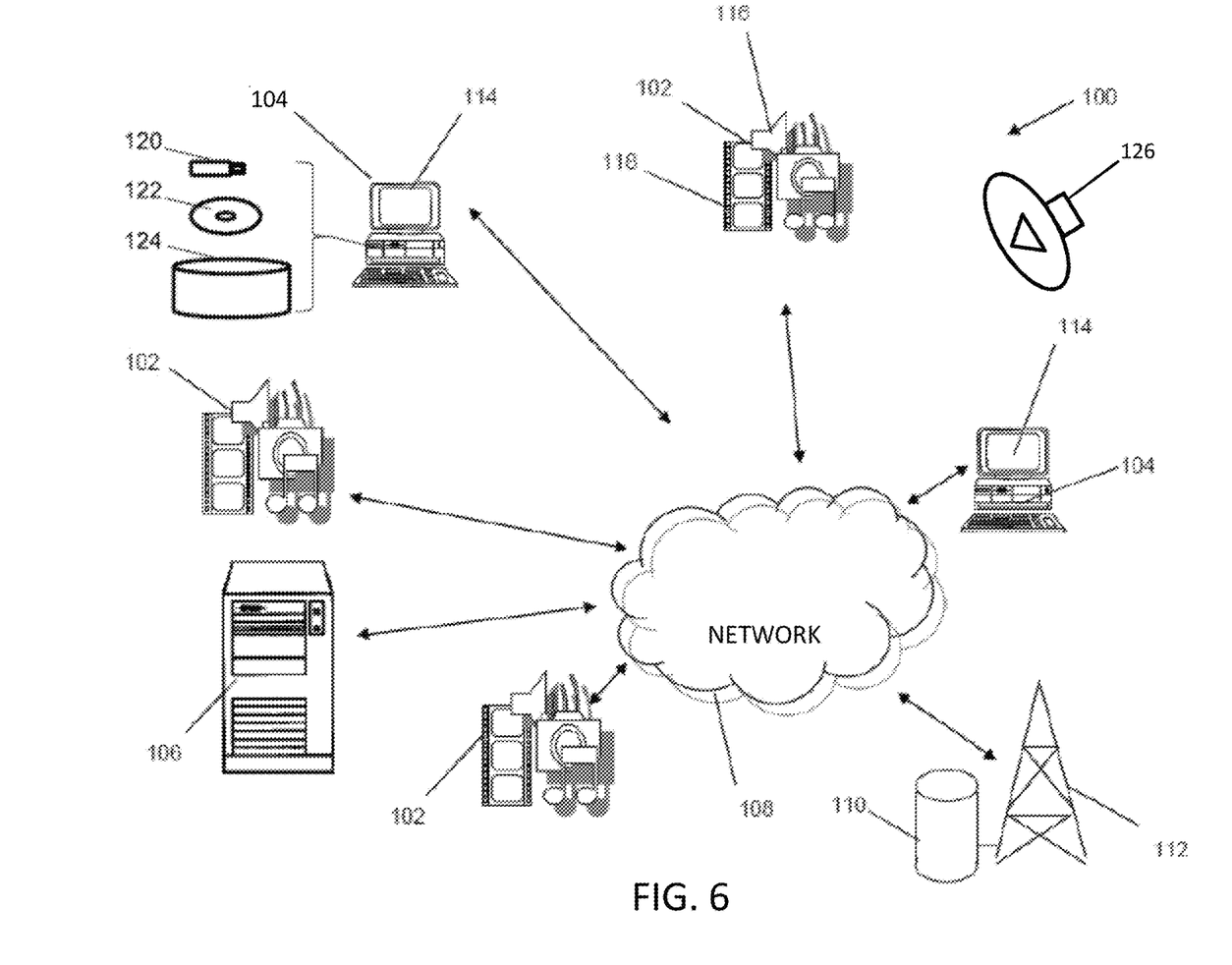
FIG. 6 is a schematic diagram illustrating an overall view of communication devices, computing devices, and mediums for implementing embodiments of the invention.

In specific inventive embodiments the administrator of the system receives feedback from users in a number of ways illustratively including:
    User account trends and patterns
        New user registration
        Account cancellations
        Login activity
        Password reset requests
        Most viewed categories, reputation data sources, and profiles
        Fix it requests
        Direct messages
    Administrator features illustratively include:
1. Manage Users
    a. Add A New User
    b. Delete A User
    c. Pause A User
    d. Upgrade A User
2. Reputation Data
    a. Select User
        i. Add/edit/delete account keywords
        ii. Pause/Restart account text alerts
        iii. View Reputation Data
            1. Rate It—This will allow the admin to rate the importance of the reputation data. We will use the following scale to score the information:
                a. Low=17%
                b. Medium=53%
                c. High=95%
            2. Expert Insight—This will allow the admin to add notes to selected reports offering better insight and recommendations for the user.
            3. Add to Reports—This will allow selected alerts to be added to the Reports feature.
3. Competitor Intelligence
    a. Select User
        i. Select Competitor
            1. Edit/Save—Changes in leadership positions
            2. Edit/Save—Acquisitions
            3. Edit/Save—Mergers
            4. Edit/Save—Business discontinuance
            5. Edit/Save—New products
            6. Edit/Save—New Services
            7. Edit/Save—New client wins
            8. Edit/Save—New SEO Ranking
            9. Expert Insight—This will allow the admin to add notes to selected competitor profiles offering better insight and recommendations to the user.
            10. Add To Reports
4. Reports
    a. Usage Report (sort by date range)
        i. Total number of system users
        ii. Total Free Accounts
        iii. Total Upgraded Accounts
        iv. Pending renewals within the date range selected
    b. Select User
        i. View reports designated by the user or the admin for this area. Reports will be available for download in PDF or CSV file format.
        ii. The reports will be organized in the following way:
            1. Date
            2. Title of the Report
            3. A brief summary of what is included in the report
5. Support
    a. Messaging
        i. Select Single User
            1. Create and send custom message
        ii. Select All Users
            1. Create and send custom message
    b. Text Alerts
        i. Select Single User
            1. Pause Alerts
            2. Activate Alerts
    c. Help Requests
        i. Organized by Date
            1. User Name
            2. Request
    d. Fix It Requests
        i. Organized by Date
            1. User Name
            2. Comment/Phrase
            3. Keyword
            4. Date of submission FIG. 6 is a schematic diagram illustrating an overall view of communication devices, computing devices, and mediums for implementing the reputation management software platform according to embodiments of the invention. The elements of the embodiments of FIGS. 1-5 are included in the networks and devices of FIG. 6.

The system 100 includes multimedia devices 102 and desktop computer devices 104 configured with display capabilities 114 and processors for executing instructions and commands. The multimedia devices 102 are optionally mobile communication and entertainment devices, such as cellular phones and mobile computing devices that in certain embodiments are wirelessly connected to a network 108. The multimedia devices 102 typically have video displays 118 and audio outputs 116. The multimedia devices 102 and desktop computer devices 104 are optionally configured with internal storage, software, and a graphical user interface (GUI) for carrying out elements of the platform according to embodiments of the invention. The network 108 is optionally any type of known network including a fixed wire line network, cable and fiber optics, over the air broadcasts, satellite 126, local area network (LAN), wide area network (WAN), global network (e.g., Internet), intranet, etc. with data/Internet and remote storage capabilities as represented by server 106. Communication aspects of the network are represented by cellular base station 110 and antenna 112. In a preferred embodiment, the network 108 is a LAN and each remote device 102 and desktop device 104 executes a user interface application (e.g., Web browser) to contact the server system 106 through the network 108. Alternatively, the remote devices 102 and 104 may be implemented using a device programmed primarily for accessing network 108 such as a remote client. The network 108 may be accessed by the user during a reputation management service operation.

The software for the platform, of embodiments of the invention, may be resident on a USB thumb or flash drive 120, CD or DVD 122, or an external hard drive 124 for connection to desktop or laptop computers 104, or stored within the server 106 or cellular base station 110 for download to an end user. Server 106 may implement a cloud-based service for implementing embodiments of the platform with a multi-tenant database for storage of separate client data that may be transferred during a reputation management service operation from a computer or laptop 104.

Other Embodiments

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes may be made in the function and arrangement of elements without departing from the scope as set forth in the appended claims and the legal equivalents thereof.

The invention claimed is:

1. A computer-implemented method for automated online reputation monitoring and intelligence gathering, comprising executing on a processor the steps of:

receiving a set of keywords and phrases submitted by an end user from a user device, the user device networked with a sever with the processor executing the method;

creating, by the end user, a set of user filters based on the submitted set of keywords and phrases and based on user identified public sources that will and will not be monitored;

creating, by an administrator, a set of administrator filters based on administrator identified public sources that will and will not be monitored, and a customized programming language script;

monitoring or searching based on the set of keywords, the user filters, and the set of administrator filters online sources, websites, and social networks to obtain information related to the end user;

aggregating the obtained information from the online sources, websites, and social networks and categorizing the obtained information into one of four categories including threat, positive information to the end user, a marketing opportunity, and competitive intelligence;

storing the categorized aggregated information in a database;

rating importance of the obtained information from the online sources, websites, and social networks for each category as one of low, medium, and high;

scaling the low rated obtained information by a first percentage, the medium rated obtained information by a second percentage that is greater than the first percentage, and the high rated obtained information by a third percentage that is greater than the second percentage;

calculating automatically a set of individual online reputation scores for each of the threat, positive information to the end user, marketing opportunity, and competitive intelligence categories, by totaling the scaled low rated obtained information, the scaled medium rated obtained information, and the scaled high rated obtained information for each category to obtain a scaled rated total for each category and then dividing the scaled rated total for each category by a total number of selections of each category;

notifying the end user automatically with an alert when a calculated individual online reputation score exceeds a threshold value of a plurality of thresholds the alert containing an option to request reputation management assistance;

receiving an on-demand request from the end user from the user device to fix their online reputation in response to the alert;

sending the request to the administrator or support personnel to fix the online reputation of the end user prompting the administrator or support personnel to review the online reputation of the end user and to assist in managing the online reputation of the end user; and measuring an improvement of regression of the assistance in managing the online reputation of the end user;

wherein the plurality of thresholds are set up during creation of the user's account and wherein the plurality of thresholds include a threshold number of results for each keyword and phrase of the set of keywords and phrases in each of the identified public sources being monitored that when exceeded trigger the alert.

2. The method of claim 1 wherein said received set of keywords and phrases are inputted via a graphical user interface (GUI) supplied to the end user.

3. The method of claim 1 wherein said one or more online sources, websites, and social networks comprise at least one of: online search engines, blogs, authority blogs, industry and niche forums, and online review websites, social media websites, social bookmarking websites, social news websites, informational websites, wikis, creative commons databases, image sharing websites, image posting websites, online one-way review websites, online two-way review websites, real simple syndication (RSS) feeds, online news websites and sources, online forums, online communities, public record websites, email address information, personal residence information, business entity information and filings, online video file websites and networks, online audio file websites and networks, online book repositories, online video game websites and networks, and legal/court documents that are available in the public domain.

4. The method of claim 1 further comprising filtering the aggregated information for relevance and then displays the information on a graphical user interface (GUI) supplied to the end user.

5. The method of claim 1 wherein the user device comprises one of a smartphone, a tablet, a portable computing device, and desktop computing devices.

6. The method of claim 1 wherein the intelligence gathering comprises company brand monitoring, personnel monitoring, competitive intelligence, monitoring of products and services, gathering of online sentiment, monitoring commentary made by users online, discovery of new business opportunities, discovery of new sources for online marketing, discovery of new sources for online reputation monitoring, and revealing online marketing strategies of the competition.

7. The method of claim 1 wherein the online reputation monitoring and intelligence gathering is offered as a cloud based service.

8. The method of claim 1 the alert appears graphically on the end user's device and is also announced as an audio alert.

9. The method of claim 1 wherein alerts are sent when an online resource or data source meets at least one of the following criteria: a keyword or a phrase that matches in a source meta title, a keyword or a phrase that matches in a source meta description, a keyword or phrase that matches in a source universal resource locator (URL), and a keyword or phrase that matches in a source content.

10. The method of claim 1 wherein the request is based on recommendations of one or more of the following services: website development, search engine optimization (SEO), search engine advertising, blog development and blogging services, custom content development, social media marketing, web analytics, and online link development.

11. The method of claim 1 wherein the user device has a universally unique identifier (UUID) that is used to identify the end user.

12. The method of claim 1 wherein the alert is accompanied with an end user selection for a fix it option to generate the request from the end user to fix their online reputation.

13. A non-transitory computer readable medium for implementing automated online reputation monitoring and an intelligence gathering application, comprising instructions stored thereon, that when executed on a processor, perform the steps of:
    providing an application (app) for an end user device with a graphical user interface (GUI) from a platform;
    receiving a set of keywords and phrases submitted by the end user via the GUI on the end user device, the user device networked with a sever with the processor executing the method of;
    creating, by the end user, a set of user filters based on the submitted set of keywords and phrases and based on user identified public sources that will and will not be monitored;
    creating by an administrator, a set of administrator filters based on administrator identified public sources that will and will not be monitored, and a customized programming language script;
    monitoring or searching based on the set of keywords, the user filters, and the set of administrator filters online sources, websites, and social networks to obtain information related to the end user;
    aggregating the obtained information from the online sources, websites, and social networks and categorizing the obtained information into one of four categories including threat, positive information to the end user, a marketing opportunity, and competitive intelligence;
    storing the categorized aggregated information in a database;
    rating importance of the obtained information from the online sources, websites, and social networks for each category as one of low, medium, and high;
    scaling the low rated obtained information by a first percentage, the medium rated obtained information by a second percentage that is greater than the first percentage, and the high rated obtained information by a third percentage that is greater than the second percentage;
    calculating automatically a set of individual online reputation scores for each of the threat, positive information to the end user, marketing opportunity, and competitive intelligence categories, by totaling the scaled low rated obtained information, the scaled medium rated obtained information, and the scaled high rated obtained information for each category to obtain a scaled rated total for each category and then dividing the scaled rated total for each category by a total number of selections of each category;
    notifying the end user automatically with a calculated alert when an individual online reputation score exceeds a threshold value of a plurality of thresholds, the alter containing an option to request reputation management assistance;
    receiving an on-demand request from the end user from the user device to fix their online reputation in response to the alert;
    sending the request to the administrator or support personnel to fix the online reputation of the end user prompting the administrator or support personnel to review the online reputation of the end user and to assist in managing the online reputation of the end user; and
    measuring an improvement of regression of the assistance in managing the online reputation of the end user;
    wherein the plurality of thresholds are set up during creation of the user's account and wherein the plurality of thresholds include a threshold number of results for each keyword and phrase of the set of keywords and phrases in each of the identified public sources being monitored that when exceeded trigger the alert.

14. The non-transitory computer readable medium of claim 13 wherein said executed steps further comprise filtering the aggregated information for relevance and then displays the information on a graphical user interface (GUI) supplied to the end user.

15. The non-transitory computer readable medium of claim 13 wherein the intelligence gathering comprises company brand monitoring, personnel monitoring, competitive intelligence, monitoring of products and services, gathering of online sentiment, monitoring online comments made by users, discovery of new business opportunities, discovery of new sources for online marketing, discovery of new sources for online reputation monitoring, and revealing online marketing strategies of the competition.

16. The non-transitory computer readable medium of claim 13 wherein the online reputation monitoring and intelligence gathering is offered as a cloud based service.

17. The non-transitory computer readable medium of claim 13 wherein alerts are sent when an online resource or data source meets at least one of the following criteria: a keyword or a phrase that matches in a source meta title, a keyword or a phrase that matches in a source meta description, a keyword or phrase that matches in a source universal resource locator (URL), and a keyword or phrase that matches in a source content.

18. The non-transitory computer readable medium of claim 13 wherein the alert is accompanied with an end user selection for a fix it option to generate the request from the end user to fix their online reputation.

19. A system for implementing automated online reputation monitoring and intelligence gathering, said system comprising:
  a computer server networked to one or more end user devices, where said computer server is configured to run a non-transitory computer readable medium stored in a memory system, comprising instructions stored thereon for online reputation monitoring and intelligence gathering, that when executed on a processor, perform the steps of:
  receiving a set of keywords and phrases submitted by an end user from a user device;
  creating, by the end user, a set of user filters based on the submitted set of keywords and phrases and based on user identified public sources that will and will not be monitored;
  creating by an administrator, a set of administrator filters based on administrator identified public sources that will and will not be monitored, and a customized programming language script;
  monitoring or searching based on the set of keywords, the user filters, and the set of administrator filters online sources, websites, and social networks to obtain information related to the end user;
  aggregating the obtained information from the online sources, websites, and social networks and categorizing the obtained information into one of four categories including threat, positive information to the end user, a marketing opportunity, and competitive intelligence;
  storing the categorized aggregated information in a database;
  rating importance of the obtained information from the online sources, websites, and social networks for each category as one of low, medium, and high;
  scaling the low rated obtained information by a first percentage, the medium rated obtained information by a second percentage that is greater than the first percentage, and the high rated obtained information by a third percentage that is greater than the second percentage;
  calculating automatically a set of individual online reputation scores for each of the threat, positive information to the end user, marketing opportunity, and competitive intelligence categories, by totaling the scaled low rated obtained information, the scaled medium rated obtained information, and the scaled high rated obtained information for each category to obtain a scaled rated total for each category and then dividing the scaled rated total for each category by a total number of selections of each category;
  notifying the end user automatically with an alert when a calculated individual online reputation score exceeds a threshold value of a plurality of thresholds, the alert containing an option to request reputation management assistance;
  receiving an on-demand request from the end user from the user device to fix their online reputation in response to the alert;
  sending the request to the administrator or support personnel to fix the online reputation of the end user prompting the administrator or support personnel to review the online reputation of the end user and to assist in managing the online reputation of the end; and
  measuring an improvement of regression of the assistance in managing the online reputation of the end user;
  wherein the plurality of thresholds are set up during creation of the user's account and wherein the plurality of thresholds include a threshold number of results for each keyword and phrase of the set of keywords and phrases in each of the identified public sources being monitored that when exceeded trigger the alert.

* * * * *